(12) United States Patent
Cradick

(10) Patent No.: US 8,311,510 B2
(45) Date of Patent: Nov. 13, 2012

(54) SYSTEM FOR AUTOMATICALLY PROVIDING FIREFIGHTERS WITH THE FLOOR PLANS FOR A BURNING BUILDING

(76) Inventor: Gregory Cradick, Westfield, IN (US)

( * ) Notice: Subject to any disclaimer, the term of this patent is extended or adjusted under 35 U.S.C. 154(b) by 33 days.

(21) Appl. No.: 12/787,784

(22) Filed: May 26, 2010

(65) Prior Publication Data

US 2011/0294461 A1  Dec. 1, 2011

(51) Int. Cl.
*G06F 15/16* (2006.01)
(52) U.S. Cl. ..................... 455/404.2; 340/531
(58) Field of Classification Search ............ 455/404.1, 455/404.2; 340/506, 517, 531, 584
See application file for complete search history.

(56) References Cited

U.S. PATENT DOCUMENTS

| | | | |
|---|---|---|---|
| 4,521,645 A | 6/1985 | Carroll | |
| 6,675,091 B2 | 1/2004 | Navab | |
| 6,873,256 B2 | 3/2005 | Lemelson et al. | |
| 6,963,282 B1 | 11/2005 | Yeates et al. | |
| 7,134,088 B2 | 11/2006 | Larsen | |
| 7,263,379 B1 | 8/2007 | Parkulo et al. | |
| 2003/0125998 A1 | 7/2003 | McKenney et al. | |
| 2003/0195814 A1 | 10/2003 | Striemer | |
| 2005/0213155 A1 | 9/2005 | Ciccarelli | |
| 2007/0103294 A1 | 5/2007 | Bonecutter et al. | |
| 2007/0227020 A1 | 10/2007 | Barany | |
| 2010/0061526 A1* | 3/2010 | Blatchley et al. | 379/39 |

* cited by examiner

*Primary Examiner* — Sam Bhattacharya
(74) *Attorney, Agent, or Firm* — C. John Brannon; Brannon Robinson PC

(57) ABSTRACT

A method for automatically transmitting requested floor plans to emergency responders en route to a building, including receiving a request for the plans for a building located at a location identified as the destination of emergency responders, retrieving requested plans from a central database, and transmitting retrieved plans to emergency responders. The central database includes plans for a plurality of buildings located at a plurality of respective locations.

14 Claims, 1 Drawing Sheet

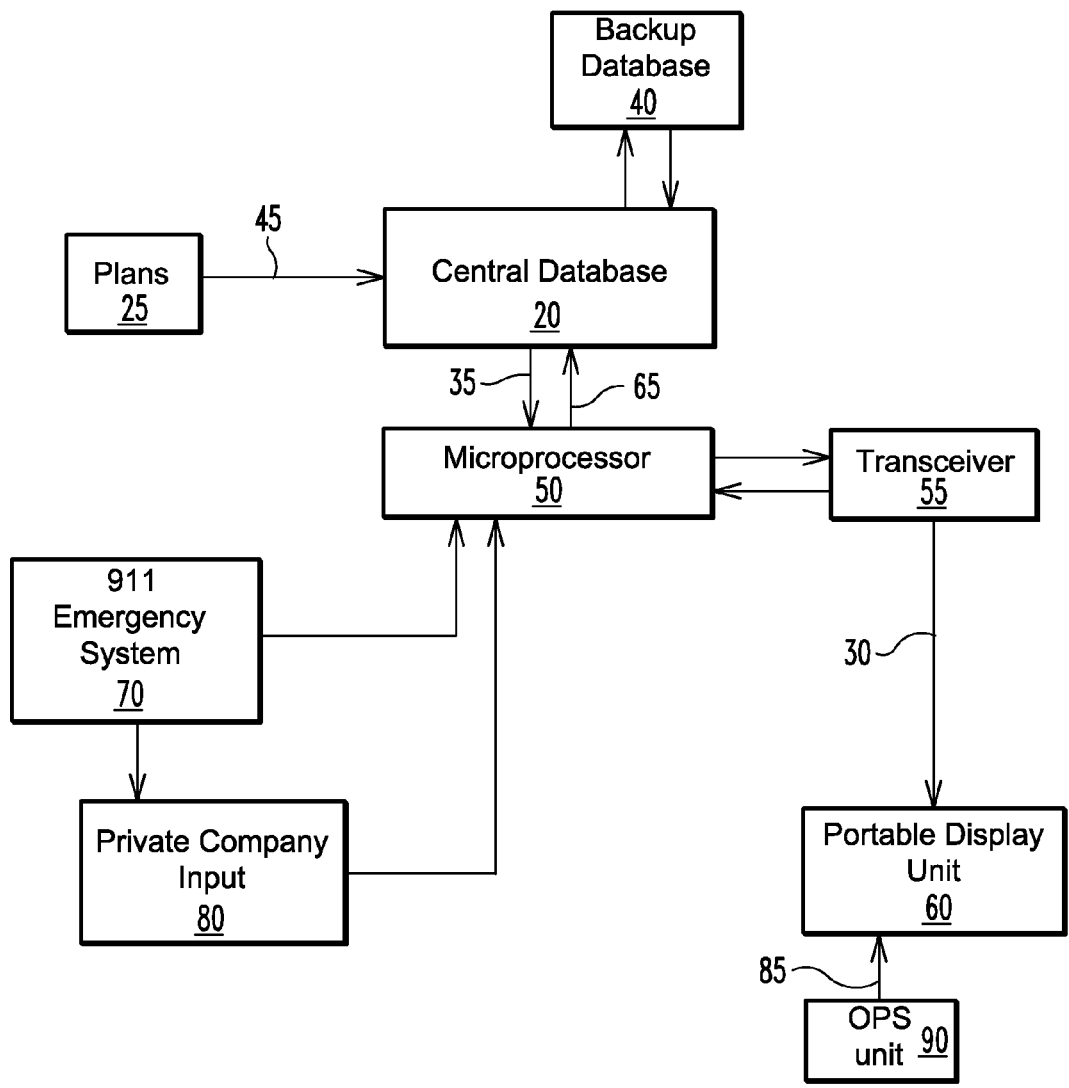

SYSTEM FOR AUTOMATICALLY PROVIDING FIREFIGHTERS WITH THE FLOOR PLANS FOR A BURNING BUILDING

TECHNICAL FIELD

The novel technology relates generally to the field of safety and, specifically, to a method and apparatus for providing firefighters the floor plans of a building while they are travelling thereto in response to an emergency.

BACKGROUND

Emergency responders, such as firemen, paramedics, and the like, often have just a few minutes between receiving an emergency call and arriving at the scene. Upon arrival, the emergency responders must then do their job, such as fighting a fire and/or rescuing the injured. As such, the emergency responder often must first find injured or endangered persons before they can remove them from harm's way and/or give them medical attention. With just a few minutes to prepare, the emergency responders are often thrust into situations wherein they must find injured persons in a completely unknown environment, or they must clear an unfamiliar structure (such as a burning building) of all persons. This is difficult to do when the plan of the building is completely unknown to the responder.

In the case of firefighters, the task is further complicated by the tendency for a fire to spread along unblocked open spaces, which act as chimneys for the hot smoke and gas. As fires tend to spread into areas of increased oxygen, it is important for firefighters to know the layout of a structure in order to most effectively do their job. In most cases, this information is gathered on site by firefighters entering the burning structure and revising their strategies on the fly.

The problem is compounded in residential structures, since the variety of design of homes is very great. Unlike commercial structures, which tend to be similar in functionally-driven design, home designs may vary greatly, and it is difficult to guess the layout of the home from a brief look at the front. For example, the number and placement of the bedrooms is impossible to accurately determine at a glance and emergency responders must manually search a burning house to make sure all of the rooms are clear. This takes time, and increases the risk of harm to both occupants and firemen.

In addition, the construction type and building materials used are also unknowns to firemen arriving at the scene. These factors influence burn rate (and thus the maximum safe time firemen can be in the building), structural integrity, whether or not toxic gasses will be evolved during combustion, and the like. All of these factors influence how long occupants may survive in the structure, which rooms are at greatest risk, how firemen should approach entry, what firefighting techniques may best be applied, and the like.

Thus, there is a need for emergency responders to gather details regarding the layout and construction details of a building or structure while en route, so that they can begin to formulate a response strategy prior to arrival. The present invention addresses this need.

SUMMARY

The present invention relates to a system and method for providing building plans to emergency responders while they are en route. One object of the present invention is to provide an improved means for providing building plan information to emergency responders. Related objects and advantages of the present invention will be apparent from the following description.

BRIEF DESCRIPTION OF THE DRAWINGS

FIG. 1 is a schematic view of a building plan retrieval and retransmission system according to a first embodiment of the present novel technology.

DESCRIPTION OF THE PREFERRED EMBODIMENTS

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

As illustrated in FIG. 1, a first embodiment of the present novel technology relates to a system 10 for storing in a central database 20 the floor plans 25 for a plurality of buildings and for providing transmission 30 of a set of stored floor plans 25 for a building identified as the destination of emergency responders to the emergency responders. For example, the plans 25 for a burning building may be retrieved 35 and transmitted 30 to firefighters, and specifically to the fire battalion chief, while they are en route thereto, enabling the battalion chief to have some advance knowledge of the layout of the building so that he may more effectively formulate strategies for both extinguishing the fire and for rescuing any trapped people, while minimizing risk to his firefighters.

The plans 25 are typically standardized to a predetermined scale. More typically, the plans 25 include an information sheet (typically in a format familiar to firefighters, such as in the format of a pre-incident report) and include such information as building/construction type, building materials used, coupling type of the nearest fire hydrant, roof type, coordinates (longitude and latitude) of the building, and the like. In some embodiments, the plans 25 include a 3D and/or 360 degree rotational and/or aerial view of the building and surrounding buildings. In other embodiments, the plans 25 may include a link to internet-based mapping services such that an aerial view of the building and its surrounding neighborhood may be readily obtained.

The central database 20 is typically located in a remote and secure location, and is more typically backed up by a secondary database 40 located in a different location from the first. The database receives 45 plans for a plurality of different buildings. The respective building plans 25 are typically referenced by their address and/or coordinates, such that they may be searched and cross-referenced with the address to which emergency responders have been directed. The system 10 typically includes a microprocessor 50 operationally connected to the database 20, and more typically includes a transceiver 55 or the like operationally connected to the microprocessor 50 for both receiving 45 queries and floor plan input for the database 20 and for transmitting 30 retrieved plans 25 to emergency responders.

The database 20 is typically queried 65 in response to a received emergency call, such as a 911 call or the like, and if building plans 25 are found matching the address to which emergency responders are being dispatched, the plans 25 are retrieved 35 by the microprocessor 50 and are subsequently transmitted 30 to emergency responders travelling to or already at the identified destination or address to which emergency responders have been directed. The plans 25 are typically received by and displayed on a portable electronic display device 60.

In one embodiment, the 911 emergency system 70 is connected in electric communication with the microprocessor 50 such that an address entered into the 911 system 70 is automatically relayed to the microprocessor 50, the database 20 is queried, the 911 system address is compared to the addresses in the database 20. If a match is found, the plans 25 corresponding to the address are retrieved 45 and transmitted 30 to the emergency responders dispatched to that address, with their contact and routing information likewise retrieved 45 from the 911 system. Alternately, the 911 emergency operator may initiate transmission of the address to the system 10 for query 65 and transfer 35 of the floor plans 25 upon receipt of the call. The 911 operator may access plans 25 while taking the emergency call and ask questions regarding how many occupants are left and where occupants are located and/or trapped in in the burning building. This information may be relayed to the responders, either verbally, via a smart phone application, annotated on the plans 25 (such as via an editing tool) prior to transmission 30, or the like. Still alternately, the emergency responders, such as the fire department, paramedics, or the like, may query 65 the database 20 upon receipt of an alert.

The database 20 may be maintained by the city government, who are already charged with keeping residential and commercial building plans 25 on file. Alternately, a private company 80 may collect and maintain the floor plans 25 of subscribers. In one embodiment, the private company monitors 911 calls, and, either manually or automatically, provides the floor plans 25 to firefighters en route to an address that matches the address of plans 25 stored in the database 20. The plans 25 are then read and displayed on the battalion chief's laptop 60, so that he may coordinate his firefighting team more effectively.

In a second embodiment, the plans 25 may be electronically stored at the residence or business location and queried 65 automatically by firefighters as they arrive, such as by RFID, bluetooth, or the like, and displayed on one or more laptops, PDAs, and/or the like 60.

In a third embodiment, the system 10 operates as described above, but with the addition of a real-time overlay on the plans 25 as displayed on the battalion chief's laptop 60 or like display unit of each firefighter's position in the structure. The plan 25 as displayed on the portable display unit 60 is synched to the GPS positioning signals 85 received from GPS transceivers 90 carried by respective individual firefighters. Typically, the plans 25 are viewed to a standardized scale, and more typically the plans 25 are tagged with GPS or other navigational information (map coordinates, compass direction, reference point of origin, and/or the like) so that the plans 25 may be oriented and overlayed with other map information, such as the surrounding neighborhood, GPS firefighter positions, or the like. The battalion chief is able to coordinate his team by knowing their location relative to the floor plan 25. Additionally, the floor plans 25 (and relative positioning of each firefighter, if enabled) may be displayed internally on the visor of each firefighter's helmet 60.

In operation, the system 10 functions as follows. The system 10 receives a request for the plans 25 for a building located at an address identified as the destination of emergency responders. The microprocessor 50 retrieves requested plans 25 matching the address identified as the destination of the emergency responders from the central database 20, which includes plans for a plurality of buildings located at a plurality of respective addresses. The retrieved plans 25 are then transmitted 30 to the emergency responders. Typically, the plans 25 are transmitted 30 with a security check or authorization code for verification.

In a commercial embodiment, a stored list of subscribers' addresses may be first stored in the database 20. Each set of floor plans 25 is associated with each respective subscriber's address. The address associated with an incoming emergency call is compared with the stored list of subscribers' addresses to find a matching subscriber's address. identifying a matching subscriber's address as the destination for emergency responders and a request is generated for the plans for the building associated with the subscriber's address identified as the destination for emergency responders.

Typically, receipt of the transmitted plans by emergency responders is verified, such as by a return signal from the responder's portable display unit 60, and more typically the plans 25 are resent at predetermined intervals until verification of receipt of the plans 25 by emergency responders is achieved. Still more typically, a manual confirmation may be queried as a failsafe.

The responder(s) receive the retrieved plans 25 transmitted 30 thereto and the received plans 25 are displayed on a portable electronic display unit 60. Typically, at least one responder will edit or otherwise use the received and displayed plans 25 to coordinate the efforts of other emergency responders, such as by retransmitting edited plans 25 to emergency responders. The other responders may be equipped with location transmitters 90, such as GPS devices, and their location information may be received 85 and overlayed onto displayed received plans 25, so that the coordinating responder may communicate instructions to emergency responders based on their location and other information.

In some embodiments, responders having designated, specialized tasks may be sent only information relevant to those tasks, such that they are not inundated with irrelevant information, thus avoiding wasting time sorting through irrelevant information. For example, firefighters are often assigned positions or seats on their vehicle that correspond to designated tasks and functions. The plans 25 may be received by a microprocessor 50 mounted in or otherwise connected to the firetruck, and the information therein may be selectively apportioned to each firefighter, such as by displays positioned at each seat, either automatically or manually.

Typically, the emergency call is a 911 call. More typically, some or all of the above steps occur automatically, although they may be performed manually as well.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A system for automatically providing floor plan information to emergency responders before they arrive, comprising:

a centralized database, the centralized database located in secure location different than a location designated by emergency call address information;

a plurality of sets of building floor plans stored in the database and indexed by address such that each set of building floor plans is searchable by address and coordinates;

a microprocessor operationally connected to the database;

at least one transceiver operationally connected to the microprocessor for receiving the emergency call address information and for automatically transmitting floor plans corresponding to the emergency call address information to emergency responders;

wherein the microprocessor identifies a building floor plan stored within the centralized database based upon the emergency call address information and retrieves the building floor plan from the centralized database for transmittal to the emergency responders via the transceiver.

2. The system of claim 1 wherein the emergency call is a 911 call that is received by a 911 emergency call system.

3. The system of claim 1 wherein the microprocessor is connected in electric communication to a 911 emergency call system.

4. The system of claim 1 and further comprising a GPS transceiver operationally connected in wireless communication with the microprocessor, wherein the GPS transceiver is carried by an emergency responder.

5. The system of claim 1 and further comprising a portable electronic display unit connected in wireless communication with the microprocessor, wherein the portable electronic display unit receives floor plans identified by the emergency call address information from the microprocessor and displays the same.

6. The system of claim 5 wherein the portable electronic display unit is a helmet-mounted head's up display, the head's up display capable of displaying a location of the helmet upon the building floor plans.

7. A method for automatically transmitting requested floor plans to emergency responders en route to a building, comprising:

a) receiving a request, as part of a response by a centralized emergency response 911 system to an emergency call, for the plans for a building located at a location identified as the destination of emergency responders;

b) retrieving requested plans from a central database; and c) transmitting portions of retrieved plans to emergency responders based upon an emergency responder's tasks;

wherein the central database includes plans for a plurality of buildings located at a plurality of respective locations.

8. The method of claim 7 and further comprising:

d) establishing a stored list of subscribers' addresses;

e) associating a set of floor plans with each respective subscriber's address;

f) comparing the address associated with an emergency call with the stored list of subscribers' addresses to find a matching subscriber's address;

g) identifying a matching subscriber's address as the destination for emergency responders;

h) generating a request for the plans for the building associated with the subscriber's address identified as the destination for emergency responders.

9. The method of claim 7 wherein the emergency call is a 911 call.

10. The method of claim 9 wherein steps b, c, e, f, g and h occur automatically.

11. The method of claim 7 and further including the step of i) verifying receipt of the transmitted plans by emergency responders; and j) resending plans at predetermined intervals until verification of receipt of the plans by emergency responders is achieved.

12. The method of claim 7 and further comprising:

i) receiving retrieved plans transmitted to emergency responders; and j) displaying received plans on a portable electronic display.

13. The method of claim 7 and further comprising:

k) editing received plans; and l) retransmitting edited plans to emergency responders.

14. The method of claim 7 further comprising:

m) receiving location information from emergency responders;

n) overlaying location information from emergency responders onto displayed received plans; and o) communicating instructions to emergency responders.

* * * * *